(12) United States Patent
Oswald et al.

(10) Patent No.: US 7,737,668 B2
(45) Date of Patent: Jun. 15, 2010

(54) BUCK-BOOST SWITCHING REGULATOR

(75) Inventors: Richard Oswald, San Jose, CA (US); Tamotsu Yamamoto, Cupertino, CA (US); Takashi Ryu, Kyoto (JP)

(73) Assignee: Panasonic Corporation, Osaka (JP)

( * ) Notice: Subject to any disclaimer, the term of this patent is extended or adjusted under 35 U.S.C. 154(b) by 228 days.

(21) Appl. No.: 11/896,974

(22) Filed: Sep. 7, 2007

(65) Prior Publication Data

US 2009/0066301 A1    Mar. 12, 2009

(51) Int. Cl.
    *G05F 1/62* (2006.01)
(52) U.S. Cl. .................. 323/259; 323/271; 323/285
(58) Field of Classification Search .............. 323/225, 323/259, 266, 271, 282, 284, 285, 344
    See application file for complete search history.

(56) References Cited

U.S. PATENT DOCUMENTS

| | | | |
|---|---|---|---|
| 4,378,530 A | 3/1983 | Garde | |
| 4,727,308 A | 2/1988 | Huljak et al. | |
| 4,943,902 A | 7/1990 | Severinsky | |
| 4,959,606 A | 9/1990 | Forge | |
| 5,305,192 A | 4/1994 | Bonte et al. | |
| 5,420,530 A | 5/1995 | Mita | |
| 5,420,532 A | 5/1995 | Teggatz et al. | |
| 5,479,090 A | 12/1995 | Schultz | |
| 5,600,234 A | 2/1997 | Hastings et al. | |
| 5,903,447 A | 5/1999 | Takahashi et al. | |
| 5,905,407 A | 5/1999 | Midya | |
| 5,929,620 A | 7/1999 | Dobkin et al. | |
| 5,949,229 A | 9/1999 | Choi et al. | |
| 5,982,160 A | 11/1999 | Walters et al. | |
| 5,991,182 A | 11/1999 | Novac et al. | |
| 6,034,517 A | 3/2000 | Schenkel | |
| 6,046,516 A | 4/2000 | Maier et al. | |
| 6,066,943 A | 5/2000 | Hastings et al. | |
| 6,147,478 A | 11/2000 | Skelton et al. | |
| 6,166,527 A * | 12/2000 | Dwelley et al. | .............. 323/222 |
| 6,166,528 A | 12/2000 | Rossetti et al. | |
| 6,222,356 B1 | 4/2001 | Taghizadeh-Kaschani | |
| 6,268,756 B1 | 7/2001 | Nayebi et al. | |
| 6,304,066 B1 | 10/2001 | Wilcox et al. | |
| 6,307,356 B1 | 10/2001 | Dwelley | |
| 6,313,610 B1 | 11/2001 | Korsunsky | |
| 6,366,070 B1 | 4/2002 | Cooke et al. | |
| 6,396,250 B1 | 5/2002 | Bridge | |
| 6,404,261 B1 | 6/2002 | Grover et al. | |
| 6,476,589 B2 | 11/2002 | Umminger et al. | |
| 6,498,466 B1 | 12/2002 | Edwards | |
| 6,509,721 B1 | 1/2003 | Liebler | |

(Continued)

*Primary Examiner*—Gary L Laxton
(74) *Attorney, Agent, or Firm*—McDermott Will & Emery LLP (57) ABSTRACT

A buck-boost switching regulator which includes a first switch, a first diode, an inductor, a second switch, a second diode, and a controller for controlling the first switch and the second switch, the controller being configured to receive a current signal indicative of a inductor current flowing in the inductor, and generating a signal indicative of an average current flowing in the inductor, the average current being utilized to control the first switch and the second switch, wherein the controller includes a first compensator circuit for outputting a voltage error signal, a second compensator circuit for outputting a current error signal and a modulator circuit to output a first control signal to control the first switch and a second control switch to control the second switch.

28 Claims, 3 Drawing Sheets

U.S. PATENT DOCUMENTS

| | | |
|---|---|---|
| 6,522,178 B2 | 2/2003 | Dubhashi et al. |
| 6,541,947 B1 | 4/2003 | Dittmer et al. |
| 6,563,725 B2 | 5/2003 | Carsten |
| 6,611,131 B2 | 8/2003 | Edwards |
| 6,724,174 B1 | 4/2004 | Esteves et al. |
| 6,744,241 B2 | 6/2004 | Feldtkeller |
| 6,828,766 B2 | 12/2004 | Corva et al. |
| 6,873,140 B2 | 3/2005 | Saggini et al. |
| 6,894,471 B2 | 5/2005 | Corva et al. |
| 6,979,985 B2 | 12/2005 | Yoshida et al. |
| 7,030,596 B1 | 4/2006 | Salemo et al. |
| 7,091,711 B2 | 8/2006 | Yoshida et al. |
| 7,109,693 B2 | 9/2006 | Yoshida et al. |
| 2003/0025484 A1 | 2/2003 | Edwards |
| 2008/0068866 A1* | 3/2008 | Blanken .................. 363/21.01 |

* cited by examiner

BUCK-BOOST SWITCHING REGULATOR

RELATED APPLICATIONS

U.S. Pat. No. 7,199,636 (filed on Mar. 31, 2005) which is entitled "Active Diode" and U.S. Patent Application Publication 20060044853 (filed on Aug. 19, 2005) which is entitled "Performance controller for a step down current mode switching regulator" are herein incorporated by reference.

BACKGROUND OF THE INVENTION

1. Field of the Invention

This invention relates to an inductor based switching regulator in which the output voltage can be less than, equal to, or greater than the input supply voltage. In particular, this invention relates to a buck-boost (step down-step up) type switching regulator which exhibits better performance than those of the prior art.

2. Background of the Related Art

Figure 1:
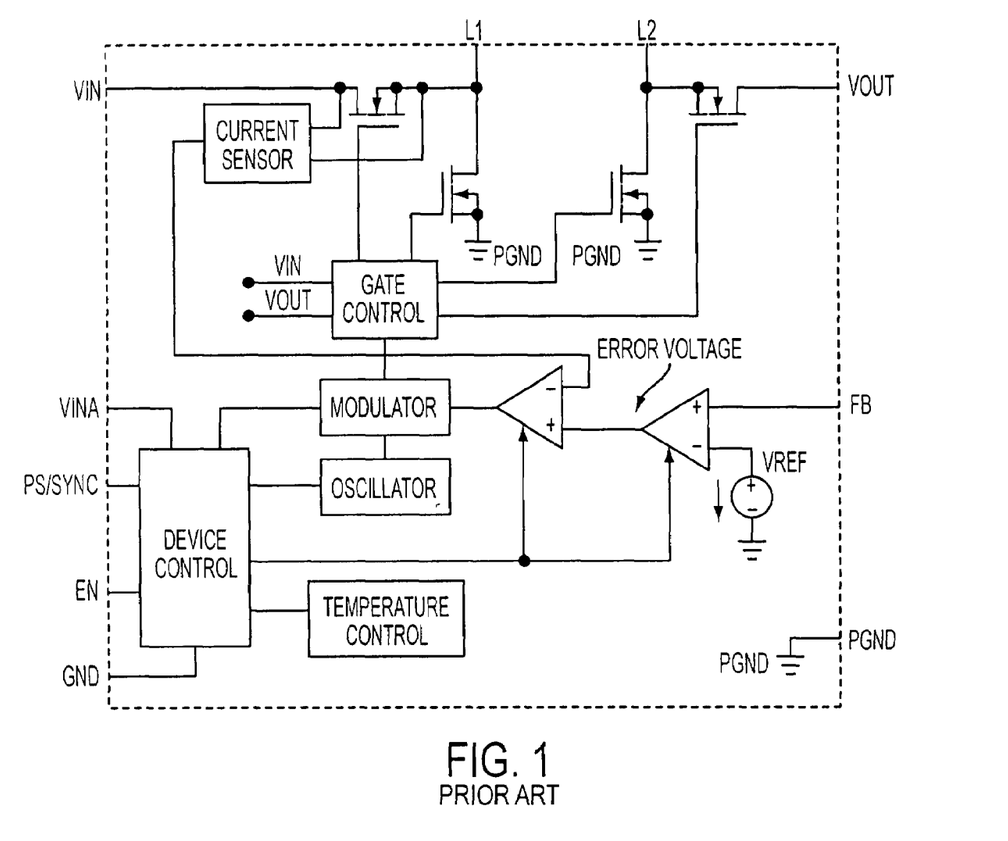
FIG. 1 is a block diagram of a prior art buck-boost switching regulator.

Most prior art buck-boost regulators utilize voltage mode control where the inductor current is not measured at all or at least not utilized in the control process. A typical configuration of a conventional buck-boost switching regulator is shown in FIG. 1, which shows a functional block diagram of TPS6300X of Texas Instruments. The regulator utilizes MOS transistors for switching and the current flowing in the input MOS transistor switch. The gate controller directly uses $V_{OUT}$ to control each of the MOS transistors. It is, however, noted from FIG. 1 that this regulator does not utilize an average current flowing in an inductor. Some other prior art switching regulators utilize instantaneous (often referred to as peak) current control where the switch or inductor current is measured and its time domain waveform is used directly in the PWM modulator as the "clock" waveform.

Voltage mode control has a slow transient response, which changes greatly between continuous current mode (CCM) and discontinuous current mode (DCM) operation unless the loop compensation is also changed. With voltage mode control, the pulse width modulation (PWM) gain at the PWM modulator varies with the supply voltage, thereby requiring supply voltage feed-forward operation in the controller for reasonably good performance. However, current measurement or slope compensation is not required for operation of a voltage mode controller.

Conventional "peak" current mode operation has inherently good transient response. Such devices can operate in both continuous and discontinuous inductor current mode without compensation change. This mode of operation also utilizes the measured current waveform for the "clock" function in the PWM modulator, and thus has inherent supply voltage magnitude compensation and fast transient response. However, the conventional "peak" current mode requires wide bandwidth current measurement, is very sensitive to noise on the current waveform, requires slope compensation in the PWM modulator to avoid instability when operating over a wide range of switch duty cycles and is difficult to configure for buck-boost operation.

On the other hand, average current mode is advantageous particularly for buck-boost functionality since it uses lower bandwidth, time averaged measured inductor current in the controller, operates in both CCM and DCM without compensation changes, requires no slope compensation regardless of duty cycle and has a quite good transient response. However, conventional average current mode devices suffer from various implementation challenges. Specifically, such devices require continuous inductor current measurement, not the intermittent switch currents; require supply voltage feed forward to maintain constant PWM gain at varying supply voltage; and need a more complex PWM modulator, especially for buck-boost operation.

Further, both CCM and DCM operation are required at fixed clock frequency for good current efficiency at small load and fast programming of the output voltage. DCM offers better light load efficiency because it reduces $I^2R$ losses in the switches and inductor and also reduces output voltage ripple magnitude. However, it can not easily provide negative polarity inductor current when needed to program a rapid decrease in the output voltage value. CCM readily provides for rapid increases and decreases in the output voltage in response to both programming and load changes. In CCM, the amplitude of the inductor ripple current, which is approximately constant, is a relatively small percentage of larger load currents. If mode transition between DCM and CCM is automated, CCM can be used automatically during transients without significantly reducing average power efficiency.

Therefore, there is a need for a buck-boost switching regulator utilizing average current mode control without excessive circuit complexity and which provides for operation in both CCM and DCM.

SUMMARY OF THE INVENTION

It is one objective of the present invention to provide a buck-boost switching regulator which provides for output voltages less than, equal to, or greater than the input voltage by adjusting the duty cycle of the control signals applied to the regulator switches.

It is another objective of the present invention to provide a buck-boost switching regulator providing for automatic transition between DCM and CCM and the use of current mode and supply voltage feedforward control so as to provide rejection of both load current and supply voltage changes in the output voltage as well as to minimize changes in transient response time as a function of load current operating point.

It is yet another objective of the present invention to provide a buck-boost switching regulator that provides for fixed frequency operation in both the DCM and CCM modes, so as to eliminate the adverse affects of unwanted frequency spectrum signals associated with BURST mode operation.

Accordingly, the present invention relates to a buck-boost switching regulator which comprises an input terminal configured to receive an input voltage $V_{IN}$; an output terminal configured to output an output voltage $V_{OUT}$; a common line; a first switch having a first terminal connected to the input terminal and a second terminal; a first diode having a cathode connected to the second terminal of the first switch and an anode connected to the common line; an inductor having a first terminal connected to the second terminal of the first switch and the cathode of the first diode and a second terminal; a second switch having a first terminal connected to the second terminal of the inductor and a second terminal connected to the common line; a second diode having an anode connected to the second terminal of the inductor and the first terminal of the second switch and a cathode connected to the output terminal; and a controller for controlling the first switch and the second switch, the controller being configured to receive a current signal indicative of a inductor current flowing in the inductor, and generating a signal indicative of an average current flowing in the inductor, the average current being utilized to control the first switch and the second switch.

The controller of the buck-boost switching regulator in accordance with the present invention may further include a first compensator circuit configured to receive a first reference voltage and a proportional output voltage indicative of the output voltage and to output a first compensator error signal; a second compensator circuit configured to receive the current signal and the first compensator error signal and to output a second compensator error signal; and a modulator circuit configured to receive the input voltage and the second compensator error output signal and to output a first control signal to control the first switch and a second control signal to control the second switch.

Further, the present invention relates to a method of regulating an output voltage in a circuit having an inductor, a first switch and a second switch, which comprises comparing a proportional output voltage indicative of the output voltage with a first reference voltage for outputting a first compensator error signal; comparing a current signal indicative of a current flowing in the inductor with the first compensator output for outputting a second compensator error signal; converting the second compensator error signal into a first error signal $E_1$ and a second error signal $E_2$; and comparing the first error signal $E_1$ with a clock signal for outputting a first control signal to control the first switch and comparing the second error signal $E_2$ with the same clock signal for outputting a second control signal to control the second switch.

One advantage of the switching regulator of the present invention is that it provides for fixed frequency operation in the discontinuous inductor current mode "DCM" at small values of load current, which provides superior light load efficiency, and for operation in the continuous inductor current mode "CCM" at large values of load current for the purpose of reducing the value of ripple current in the inductor and output capacitor (and therefore the ripple voltage at the voltage output) as well as providing superior efficiency at heavy loads.

Yet another advantage is realization of automatic transition between DCM and CCM. Furthermore, the use of current mode control and supply voltage feedforward provides rejection of both load current and input voltage changes in the output voltage as well as minimizes changes in transient response time as a function of load current operating point, and eliminates the need for slope compensation and its added complexity. Average current mode is also much more tolerant of noise on the current signal than instantaneous current control.

Additional advantages of the present invention will become apparent to those skilled in the art from the following detailed description of exemplary embodiments of the present invention.

The invention itself, together with further objects and advantages, can be better understood by reference to the following detailed description and the accompanying drawings.

DETAILED DESCRIPTION OF THE INVENTION

Figure 2:
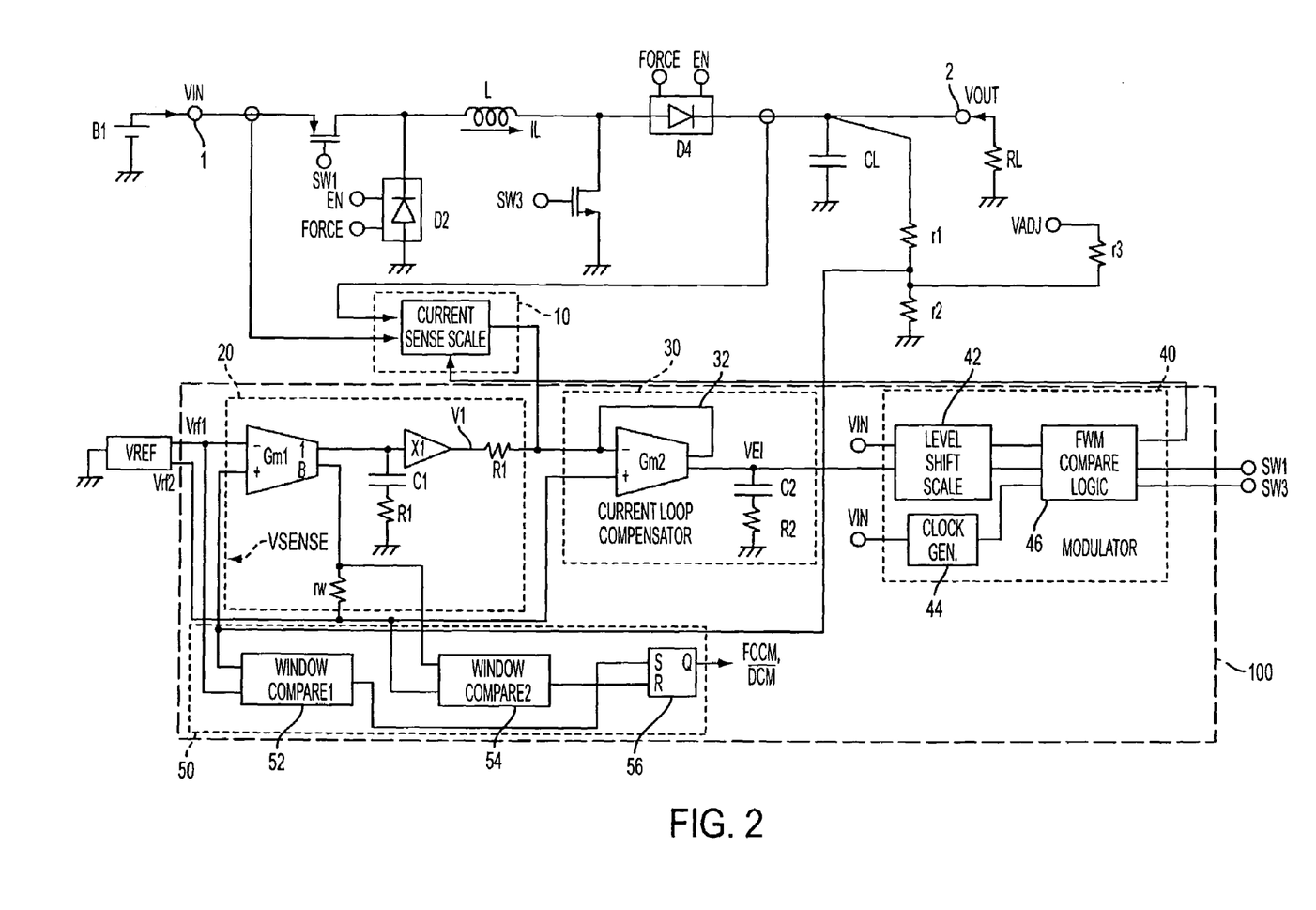
FIG. 2 is an exemplary block diagram of an embodiment of a buck-boost switching regulator in accordance with the present invention.

An exemplary configuration of the switching regulator in accordance with the present invention is shown in FIG. 2. The switching regulator in the given embodiment utilizes average current control mode and employs an input voltage ($V_{IN}$) feed-forward configuration for good supply voltage rejection. The switching regulator also operates at fixed switching frequency in both continuous and discontinuous inductor current modes (CCM and DCM, respectively), and is capable of both sourcing and sinking current in the output capacitor and load for fast output voltage programming and load change transient response. All current sensing and frequency response determining components as well as the switches and diodes may be integrated in an IC to save space and cost.

As noted above, average current mode operation is utilized in the present invention. The inductor current $I_L$ is measured, its value is time averaged and the averaged current is used for controlling the switches of the switching regulator. This is in contrast to prior art buck-boost regulators using voltage mode control where the inductor current is not measured at all or at least not used in the control process. The switching regulator of the present invention is also different from the prior art regulators which utilize instantaneous (often referred to as peak) current control where the switch or inductor current is measured and its time domain waveform is used directly in the PWM modulator as the "clock" waveform.

FIG. 2 shows a first exemplary embodiment of a buck-boost switching regulator in accordance with the present invention. The circuit topology of the buck-boost switching regulator employs four active semiconductor devices in the power flow path, a first switch SW1, a second switch SW3, a first diode D2 and a second diode D4. The first switch SW1 is connected between an input terminal 1 and an inductor L, for example a coil. The cathode of the first diode D2 is connected to the connecting point of the first switch SW1 and the inductor L and the anode of the first diode D2 is connected to a common line, for example a ground. The second diode D4 is connected between the inductor L and an output terminal 2. The anode of the second diode is connected to the inductor L and the cathode of the second diode is connected to the output terminal 2. The second switch SW3 is connected between the connecting point of the inductor L and second diode D4 and the common line.

In this embodiment, at least one of the diodes may be an active diode. For example, the configuration of the first diode D2 may be found in FIG. 4 of the U.S. Pat. No. 7,199,636. The configuration of the second diode D4 may be found in FIGS. 5B, 7 or 8B of the U.S. Pat. No. 7,199,636. The second diode D4 may include a NMOS or PMOS transistor device with its associated amplifiers and offset voltages, connected in parallel so that an output voltage can have steady state operating voltages lower than Vgs-ON and higher than an input voltage without the need for negative supplies or boosted positive supplies higher than the input voltage to operate the amplifiers and gate drivers of D4.

The first diode D2 and the second diode D4 operate as autonomous low voltage drop diodes to provide inherent steady state CCM or DCM according to the magnitude of the load current required by $R_L$. Details of this operation for buck mode can be found in FIGS. 5a, 5b and 6 and the corresponding description of U.S. Pat. No. 7,199,636.

The first switch SW1 and the second switch SW3 are configured to be driven, in the given embodiment directly driven, by a controller 100. The controller 100 in the given embodiment includes a first compensator 20, a second compensator 30, a modulator 40 and a mode controller 50.

Simplified steady state operation of the switching regulator for the case of an inductor current $I_L$ flowing in the inductor L being non-negative will now be described. In buck operation, where the input voltage $V_{IN}$ is larger than the output voltage $V_{OUT}(V_{IN}>V_{OUT})$, the first switch SW1 operates for a duty cycle of less than 100% and the first diode D2 tends to conduct for the remainder of one clock period (CCM) or until $I_L=0$ (DCM). The second diode D4 conducts when $I_L$ is positive, and thus a diode current in the second diode $I_{D4}=I_L$. Therefore, the diode current $I_{D4}$ can be determined by measuring the currents in the NMOS and PMOS transistors of D4, and scaling them appropriately. The sum of the scaled transistor currents may be used for the $I_L$ input into the controller 100.

In boost operation, where $V_{IN}<V_{OUT}$, the first switch SW1 is ON continuously. The second switch SW3 is ON for a duty cycle less than 100% and the second diode D4 is ON for the remainder of one clock period (CCM) or until $I_L=0$ (DCM). Thus the transistor current $I_{SW1}$ flowing in the first switch is equal to $I_L(I_{SW1}=I_L)$ in this mode, and $I_{SW1}$ can be measured by conventional means and used for the $I_L$ input into the controller 100.

The current sense multiplexer 10 chooses the sense values of $I_{SW1}$ or $I_{D4}$ as the indicative scaled value of $I_L$ and outputs the selected one of them to a current loop compensator 30. It is noted that the measured inductor current is not averaged in general until it is acted upon by the second compensator circuit 30, but an already averaged current may be used. The current sense multiplexer 10 is controlled by the modulator 40 so that the output from the current sense multiplexer 10 is continuous, and proportional to $I_L$. When $V_{IN}$ is almost equal to $V_{OUT}(V_{IN} \approx V_{OUT})$, the regulator operates in buck mode for a part of each clock period and in boost mode for another part of each clock period. In this case, the current sense multiplexer 10 operates the same way as described above to provide the current signal always proportional to $I_L$ to the current loop compensator 30. It is noted that, in the given embodiment, the output of the multiplexer 10 and the output of the compensator 20 after processing through resistor R1 are both currents. The other input to Gm2 is a reference voltage.

The current loop compensator 30 is configured to create an error signal based on the output from the current sense multiplexer 10 and output from the compensator 20. The current loop compensator 30 in the given embodiment utilizes a differential input transconductance amplifier Gm2. More details are described in co-pending application "Internal Frequency Compensator for Integrated Circuits," filed on Sep. 7, 2007, and assigned Ser. No. 11/896,973. The negative (−) input of the transconductance amplifier Gm2 is maintained at the same potential as the positive (+) input by the large value of the transconductance $G_{m2}$ and the feedback connection 32. The positive input (+) is coupled to the reference voltage $V_{rf2}$. The current applied to the compensator network comprising $C_2$ and $R_2$ is k times the net current at the negative (−) input node of the transconductance amplifier Gm2, where k is a proportionality factor. Thus, the output voltage $V_{E1}$, a current loop compensator error signal, of the transconductance amplifier Gm2 is:

$$V_{EI} = k \times I(-) \times \left( \frac{SR_2C_2 + 1}{SC_2} \right) \quad (1)$$

where I(−) is the net current at the negative (−) input node of the transconductance amplifier Gm2.

Figure 3:
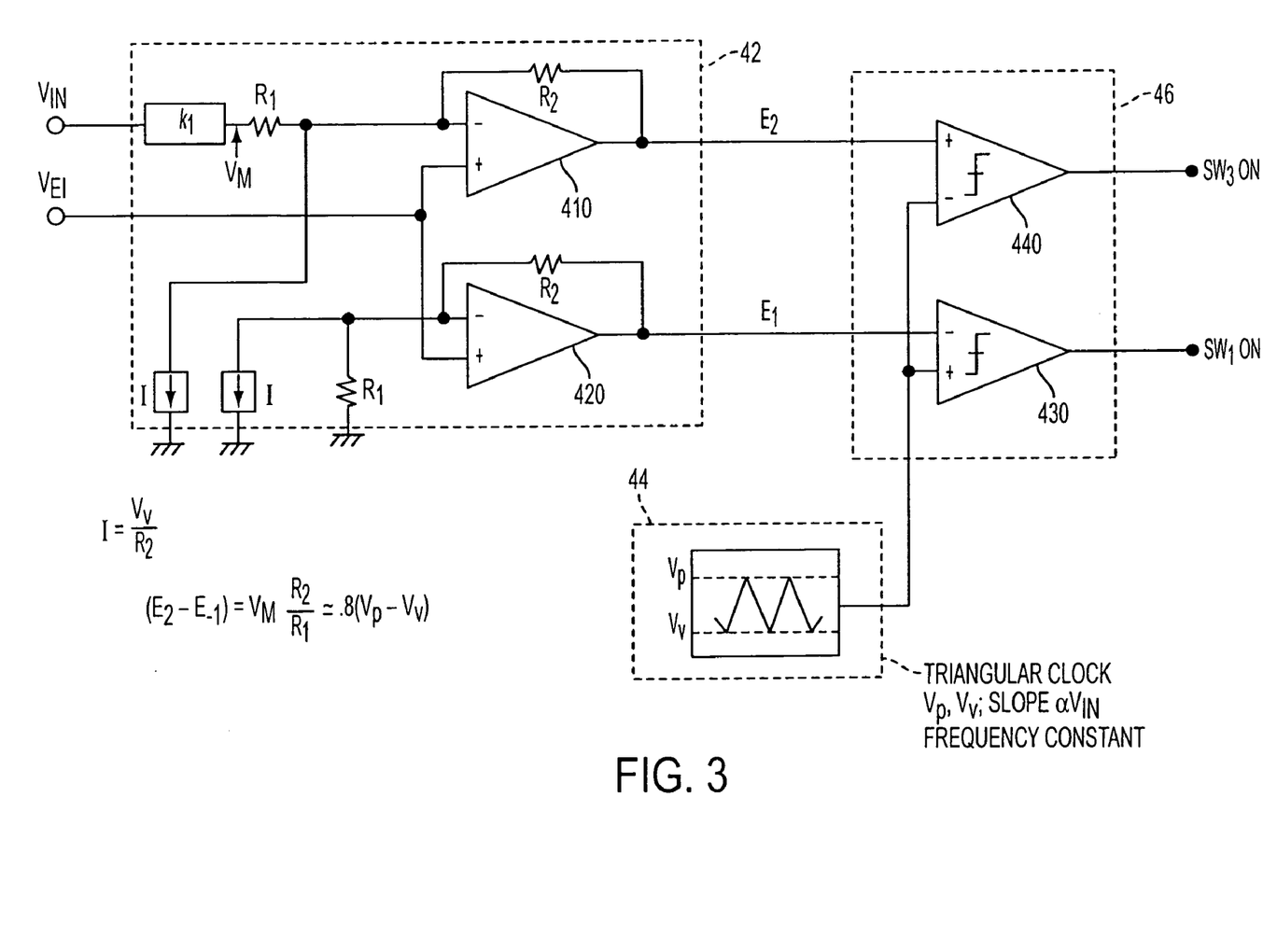
FIG. 3 is an exemplary block diagram of a modulator circuit of the controller shown in FIG. 2 in accordance with the present invention.

The output of the second compensator 30 is coupled to the modulator 40. The modulator 40 in the given embodiment comprises a level shift and scale circuit block 42, a clock generator 44 and a PWM compare circuit 46. An exemplary detailed block diagram of the modulator is shown in FIG. 3.

The level shift and scale circuit block 42 converts the current loop compensator error signal $V_{E1}$ into two signals $E_1$ and $E_2$. Referring to FIG. 3, the level shift and scale circuit block 42 in the given embodiment comprises two operational amplifiers 410 and 420 and resistors $R_1$, $R_2$ and current sinks I. The converted signals $E_1$ and $E_2$ are given as follows:

$$E_1 = \frac{R_1 + R_2}{R_1} V_{EI} + IR_2, \quad (2)$$

$$E_2 = \frac{R_1 + R_2}{R_1} V_{EI} - \frac{R_2}{R_1} V_M + IR_2, \quad (3)$$

where $V_M$ is a voltage proportional to $V_{IN}$ and is the voltage that the resistor $R_1$ returns to. The requirement of this voltage $V_M$ is that it be proportional to $V_{IN}$ with a proportionality factor $k_1$, that is $V_M = k_1 \times V_{IN}$.

The clock generator 44 generates a triangular wave signal which swings between the upper peak voltage $V_P$ and the lower valley voltage $V_V$. It is noted that at least one of $V_P$, $V_V$ and the slope of the triangular wave is proportional to the input voltage $V_{IN}$, and the frequency of the clock signal is constant.

The PWM compare logic block 46 in the given embodiment comprises a first comparator 430 which compares $E_1$ with the clock signal and a second comparator 440 which compares $E_2$ with the clock signal. Each comparator outputs a control signal to control the first switch SW1 and the second switch SW3, respectively.

In the equations (2) and (3), when the current sink I is set to $V_V/R_2$, then:

$$E_1 = \frac{R_1 + R_2}{R_1} V_{EI} + V_V \quad (4)$$

$$E_2 = \frac{R_1 + R_2}{R_1} V_{EI} - \frac{R_2}{R_1} V_M + V_V \quad (5)$$

$$E_1 - E_2 = \frac{R_2}{R_1} V_M \quad (6)$$

For convenience in designing the clock waveform generator and comparators' common mode voltage capability by way of example, $V_V$ may be chosen to be $0.1 \times V_M$ and $V_P$ to be $0.9 \times V_M$; then $(V_P - V_V) = 0.8 \times V_M$. With the previous choice of $V_V$ and $V_P$, the converted signals $E_1$ and $E_2$ are amplified by factor $(R_1 + R_2)/R_1$, are level shifted up by $V_V$, and separated by a value equal to 80% of the peak to peak amplitude of the PWM clock, $(V_P - V_V)$.

The proportionality factor $k_1$ is also related to the proportionality factor used for $V_P$, $V_V$ and the slope of the triangular clock. In fact, $k_1$ (and thus $V_M$) must be chosen such that the spacing between $E_1$ and $E_2$ as defined by equations (2) and (3) is a constant percentage less than 100 of the spacing between $V_P$ and $V_V$ in order that when $V_{IN} \approx V_{OUT}$, a portion of each clock cycle can provide buck operation and the reminder of the clock cycle boost operation for the regulator, and this division percentage is independent of $V_{IN}$.

The value of the current sink I is set by $V_V$ such that $I \times R_2 = V_V$ as indicated by equations (2)-(6). This is done so that when the output of the loop compensator circuit 20 is at its minimum of 0 or ground as shown (and set by the amplifier Gm1 in the compensator circuit 20), $E_1$ is equal to $V_V$ when the inductor current $I_L$ is zero to optimize the dynamic range of the modulator without having a dead zone. It is noted that the same I×R$_2$ must be included in E$_2$ so that E$_2$-E$_1$ is not affected by the value of I. E$_2$-E$_1$ is not in fact constant but rather proportional to V$_V$ as defined above and the equation (6).

The practical design choices made in implementation are to choose V$_P$ to be enough less than V$_{IN}$ at the minimum V$_{IN}$ allowed, by enough voltage to allow the clock circuit's amplifier to have only p-type input stages instead of rail-to-rail inputs, and this sets the value of the proportionality factor k$_1$ for V$_M$. Similarly, the minimum of V$_V$ is determined by the need for enough head room from ground at minimum V$_{IN}$ to allow switching circuits referenced to ground to be used in the clock circuits. Thus, in general (V$_V$-ground)=(V$_M$-V$_P$) is convenient and (E$_2$-E$_1$)≈(0.8~1.0)×(V$_P$-V$_V$) as described above.

The current loop compensator 30 provides for integration to average the current error signal and provide very large D.C. gain. Further, the output of the transconductance amplifier Gm2 driving R2 and C2 is a current, so the voltage V$_{E1}$ is the time integral of the net current into the current loop compensator from the first compensator 20 and the current sense multiplexer 10

$$\left(V = \frac{1}{C}\int I dt\right).$$

It is well known that the D.C. gain of an integrator is (at least ideally) infinite.

Thus, at steady state operation, the value of V$_{E1}$ and the modulator clock provide duty cycle signals, D$_{BUCK}$ and D$_{BOOST}$, from the modulator 40 in buck or boost mode that generates the required V$_{OUT}$ from V$_{IN}$:

$$\text{for buck mode:} \quad D_{BUCK} \approx \frac{V_{OUT}}{V_{IN}}, \quad \text{so } V_{OUT} \approx V_{IN} \times D_{BUCK} \tag{7}$$

$$\text{and for boost mode:} \quad D_{BOOST} \approx \frac{V_{OUT} - V_{IN}}{V_{OUT}}, \quad \text{so } V_{OUT} \approx V_{IN} \times [1/(1 - D_{BOOST})]. \tag{8}$$

With actual switches and components having loss, the relations (7) and (8) are not exact, but in practice they are accurate enough to provide useful insight. It is noted that D$_{BUCK}$ is a duty ratio of conduction for the first switch SW1 and D$_{BOOST}$ is a duty ratio of conduction for the second switch SW3. It is also noted that V$_{E1}$ and the modulator clock when compared give a duty cycle between 0 and 1 that can be found graphically. Since V$_{OUT}$ is a dependent variable, a function of V$_{rf1}$ and V$_{IN}$, V$_{E1}$ and the clock generate D$_{BUCK}$ and D$_{BOOST}$, which in turn generate V$_{OUT}$ as shown in equations (7) and (8).

For example, if desired V$_{OUT}$=0.6×V$_{IN}$, the second switch SW3 should always be OFF (since D$_{BOOST}$ is negative) and the first switch SW1 should be ON with a duty ratio of about 0.6. Thus, the control will cause E$_1$ to settle to about 60% of the voltage between V$_V$ and V$_P$, and E$_2$ will be lower than V$_V$ (saturated to ground) so that SW3 is always OFF, and the switching regulator operates in buck mode.

If the desired V$_{OUT}$=1.5×V$_{IN}$, the first switch SW1 should be always ON (since D$_{BUCK}$ is more than 1) and the second switch SW3 should be ON with a duty ratio of 0.5/1.5=33%. Thus, control will increase V$_{E1}$ so that E$_2$ becomes about 33% of the voltage between V$_V$ and V$_P$, and E$_1$ will be larger than E$_2$ and also greater than V$_P$ so that the first switch SW1 is always ON, and the switching regulator operates in boost mode.

If desired V$_{OUT}$ is equal to V$_{IN}$ (V$_{OUT}$=V$_{IN}$), then ideal D$_{BUCK}$=1 and D$_{BOOST}$=0. But, this condition is difficult to achieve in actual implementation, so (E$_1$-E$_2$) is made about 0.8×(V$_P$-V$_V$) by choice of R$_1$ and R$_2$ in the equation (6). Thus, D$_{BUCK}$~0.9 and D$_{BOOST}$~0.1, which will also result in the average V$_{OUT}$=V$_{IN}$. In this case, there is a small ripple that prevents any "dead zone" effect from tolerances in the modulator voltages. In addition, the modulator 40 sends a select signal to the current sense multiplexer 10 in order to select the current signal I$_{D4}$ from the second diode D4 if:

$$\left[(E_1 < V_P) \text{ and } \left(\text{clock} > \frac{V_P + V_V}{2}\right)\right] \text{ or } [E_2 < V_V], \tag{9}$$

which is buck mode, and otherwise select the current signal I$_{SW1}$ in the first switch SW1 since the system is in boost mode.

In FIG. 2, the output voltage V$_{OUT}$ can be adjusted by an external voltage V$_{ADJ}$, supplied from an external voltage source (not shown). V$_{OUT}$ is a function of V$_{ADJ}$ as follows:

$$V_{OUT} = V_{SENSE}\left(1 + r_1 \frac{(r_2 + r_3)}{r_2 r_3}\right) - V_{ADJ}\left(\frac{r_1}{r_3}\right), \tag{10}$$

where V$_{SENSE}$ is the voltage at the positive (+) input of Gm1. The minus (−) sign ahead of the V$_{ADJ}$ term in expression (10) means that V$_{OUT}$ can be either greater, less than, or equal to V$_{SENSE}$ by adjusting V$_{ADJ}$ to positive only values within a range determined by selection of r$_1$, r$_2$, and r$_3$.

The controller 100 in FIG. 2 may further include a voltage loop compensator 20. The voltage loop compensator 20 in the given embodiment comprises a differential input transconductance amplifier Gm1 and compensation circuit comprising C1 and R1. The transconductance amplifier Gm1 receives a first reference voltage V$_{rf1}$ at its inverting input and the voltage V$_{SENSE}$ at its non-inverting input. The voltage resulting from the output current from the transconductance amplifier Gm1 applied to the series connection of R1 and C1 is coupled to the current loop compensator 30 via a unity gain buffer amplifier X1 and a resistor RI. The output current from the transconductance amplifier Gm1 is proportional to a voltage error signal.

The output current of the transconductance amplifier Gm1 drives the compensation network C1 and R1 which provides integration of the voltage error signal (V$_{SENSE}$-V$_{rf1}$) so that at steady state, V$_{SENSE}$=V$_{rf1}$ and $$V_{OUT} = V_{rf1}\left(1 + r_1 \frac{(r_2 + r_3)}{r_2 r_3}\right) - V_{ADJ}\left(\frac{r_1}{r_3}\right). \quad (11)$$

It is desired to have $V_{OUT}$ quickly follow changes in $V_{ADJ}$ or the load ($R_L$), and still have the improved efficiency of DCM at small values of steady state load. Implementing the first and second diodes D2 and D4 as autonomous diodes and not controller driven switches inherently allows DCM operation ($I_L=0$) for a significant part of the clock period and thus provides for superior light load efficiency. But using diodes also prevents $I_L<0$ and this means that the load capacitance CL can only be discharged by the load $R_L$ when $V_{OUT}$ is programmed to a value smaller than its present value, thus the response of $V_{OUT}$ to $V_{ADJ}$ may be slower with a diode implementation which allows DCM.

This can be overcome by using active diodes as the diodes D2 and D4 and temporarily converting the diodes D2 and D4 to switches during $V_{OUT}$ transients. The active diodes D2 and D4 have a "FORCE" input to turn their internal transistors ON as switches and thus allow backward inductor current $I_L<0$ during transients. The "FORCE" inputs of active diodes D2 and D4 are controlled by the controller 100 using the Forced Continuous Current Mode (FCCM) signal.

The controller 100 in FIG. 2 may also have a mode control block 50. The mode control block 50 in the given embodiment comprises a first window comparator 52, a second window comparator 54 and a FCCM latch 56. The first window comparator 52 is configured to receive the first reference voltage $V_{rf1}$ and $V_{SENSE}$, compare the difference between these voltages with a first threshold voltage, and output a first compared signal. The second window comparator 54 is configured to receive the second output from the transconductance amplifier Gm1 as a voltage, compare the difference between this voltage and a second threshold voltage, and output a second compared signal. The FCCM latch 56 is configured to receive the first and second compared signals at a set (S) input and a reset (R) input, respectively.

When a fast transient change of $V_{OUT}$ is needed as indicated by a difference between $V_{rf1}$ and $V_{SENSE}$ which is greater than an allowable threshold established in the first window comparator 52, the FCCM latch 56 is set. When the transient response is completed, the difference between $V_{rf1}$ and $V_{SENSE}$ will be small and potentially less than the difference in offset voltage of the transconductance amplifier Gm1 and the comparator, possibly causing erroneous function of the mode control block.

This problem is overcome by using the value of current out of the transconductance amplifier Gm1 to drive the second window comparator 54 and reset the FCCM latch 56 back to DCM. By using a second output of the transconductance amplifier Gm1 with transconductance $B \times G_{m1}(B \gg 1)$ and large value resistor $r_w$, the signal at the input of the second window comparator 54 can be much larger than its offset. It is noted that the signal at the input of the second window comparator 54 still retains the same zero threshold as the output signal from the first output of the transconductance amplifier Gm1 which drives the compensator circuit $R_1$, $C_1$. Thus, the second window comparator 54 has constant common mode voltage, its threshold is referenced to the input of Gm1 and its value can be kept smaller than it would have to be for reliable operation if connected directly to the input of Gm1. This allows accurate sensing of the end of the voltage programming transient in spite of offsets in the inputs of the transconductance amplifier Gm1 and the second window comparator 54.

It is noted that the first threshold voltage may be the differential voltage that just exceeds the linear range of the input of Gm1. The second threshold voltage referenced to the input of Gm1 may be much smaller than the first threshold voltage.

As noted above, the switching regulator configured according to the present invention provides numerous advantages over the prior art devices. One advantage is that it provides for fixed frequency operation in both the discontinuous inductor current mode "DCM" at small values of load current for superior light load efficiency, and in the continuous inductor current mode "CCM" at large values of load current for the purpose of reducing the value of ripple current in the inductor and output capacitor (and therefore the ripple voltage at the voltage output) and providing superior efficiency at heavy loads. The output voltage may be less than, equal to or greater than the input voltage with no discontinuities when changing between any of these conditions.

Yet another advantage is the realization of automatic transition between DCM and CCM. The use of current mode control with supply voltage feedforward provides rejection of both load current and input voltage changes in the output voltage and minimizes changes in transient response time as a function of the load current operating point.

Although certain specific embodiments of the present invention have been disclosed, it is noted that the present invention may be embodied in other forms without departing from the spirit or essential characteristics thereof. Thus, the present embodiments are therefore to be considered in all respects as illustrative and not restrictive, the scope of the invention being indicated by the appended claims, and all changes that come within the meaning and range of equivalency of the claims are therefore intended to be embraced therein.

We claim:

1. A switching regulator, comprising:
   an input terminal configured to receive an input voltage ($V_{IN}$);
   an output terminal configured to output an output voltage ($V_{OUT}$);
   a common line;
   a first switch having a first terminal connected to said input terminal and a second terminal;
   a first diode having a cathode connected to said second terminal of said first switch and an anode connected to said common line;
   an inductor having a first terminal connected to said second terminal of said first switch and said cathode of said first diode and a second terminal;
   a second switch having a first terminal connected to said second terminal of said inductor and a second terminal connected to said common line;
   a second diode having an anode connected to said second terminal of said inductor and said first terminal of said second switch and a cathode connected to said output terminal;
   a controller for controlling a first duty ratio (D1) of said first switch, a second duty ratio (D2) of said second switch, said first switch and said second switch, said controller being configured to receive a current signal indicative of an inductor current flowing in said inductor, and generating a signal indicative of an average current flowing in said inductor, said average current being utilized to control said first switch and said second switch, and a current selector configured to select either a current flowing in said first switch or a current flowing in said second diode and to output a selected signal indicative of said selected current as a current signal indicative of said inductor current flowing in said inductor.

2. The switching regulator of claim 1, wherein said controller is configured to control said first duty ratio and said second duty ratio in order to generate said output voltage which has a desired, predetermined value, and wherein $V_{OUT} \approx V_{IN} \times D1$ in a buck mode operation and $V_{OUT} \approx V_{IN} \times [1/(1-D2)]$ in a boost mode operation.

3. The switching regulator of claim 1, wherein said controller comprises a first compensator circuit configured to receive a first reference voltage and a proportional output voltage indicative of said output voltage and to output a first compensator error signal.

4. The switching regulator of claim 3, wherein said first compensator circuit comprises:
a first differential input transconductance amplifier having a first input configured to receive said proportional output voltage, a second input configured to receive said first reference voltage, a first output and a second output; and
a first compensator network connected to said first output of said first differential input transconductance amplifier for creating said first compensator error signal.

5. The switching regulator of claim 1, wherein said controller comprises a second compensator circuit configured to receive said current signal indicative of an inductor current flowing in said inductor and a second reference voltage and to output a second compensator error signal.

6. The switching regulator of claim 5, wherein said second compensator circuit comprises:
a second differential input transconductance amplifier having a first input configured to receive said second reference voltage, a second input configured to receive a sum of said current signal indicative of said average inductor current and a current proportional to said first compensator error signal, a first output connected to said second input and a second output configured to output an output current; and
a second compensator network connected to said second output of said second differential input transconductance amplifier for creating said second compensator error signal.

7. The switching regulator of claim 1, wherein said controller comprises a modulator circuit configured to receive said input voltage and an error signal and to output a first control signal to control said first switch and a second control signal to control said second switch.

8. The switching regulator of claim 7, wherein said modulator circuit comprises:
a voltage converter for converting said input voltage to a proportional voltage $V_M = k_1 \times V_{IN}$ where $k_1$ is a constant;
a level shift and scale block configured to convert said error signal and said proportional voltage ($V_M$) into a first error signal and a second error signal;
a clock generator configured to generate a clock signal; and
a comparator block configured to compare said first error signal with said clock signal for outputting said first control signal and to compare said second error signal with said clock signal for outputting said second control signal.

9. The switching regulator of claim 8, wherein said clock signal is a triangular signal having a peak value, a valley value and a slope, and at least one of said peak value, valley value and slope is proportional to said input voltage.

10. The switching regulator of claim 1, wherein said output voltage is adjustable by an external voltage having value of $V_{ADJ}$.

11. The switching regulator of claim 10, further comprises:
a first impedance having a first terminal connected to said output terminal and a second terminal;
a second impedance having a first terminal connected to said second terminal of said first impedance and a second terminal connected to said common line; and
a third impedance having a first terminal connected to said second terminal of said first impedance and said first terminal of said second impedance and a second terminal connected to said external voltage.

12. The switching regulator of claim 1, wherein said current selector is controlled by said controller.

13. The switching regulator of claim 1, wherein at least one of said first or second diode is an active diode and is controllable by said controller.

14. The switching regulator of claim 13, wherein said active diode comprises:
a NMOS transistor having a source terminal, a drain terminal, a gate terminal and a back gate terminal, said source terminal being connected to said back gate terminal, said source terminal constituting an anode terminal of said active diode, and said drain terminal constituting a cathode terminal of said active diode;
an offset bias voltage source having a first terminal and a second terminal; and
an amplifier having a non-inverting input terminal and an inverting input terminal, and an output terminal, said inverting input terminal being connected to said drain terminal of said NMOS transistor, said non-inverting input terminal being connected to said first terminal of said offset bias source, and said output terminal being connected to said gate terminal of said NMOS transistor, wherein said second terminal of said offset bias source is connected to said source terminal of said NMOS transistor.

15. The switching regulator of claim 13, wherein said active diode comprises:
a PMOS transistor having a source terminal, a drain terminal, a gate terminal and a back gate terminal, said source terminal being connected to said back gate terminal; said source terminal constituting a cathode terminal of said active diode, and said drain terminal constituting an anode terminal of said active diode;
an offset bias voltage source having a first terminal and a second terminal; and
an amplifier having a non-inverting input terminal and an inverting input terminal, and an output terminal, said non-inverting input terminal being connected to said source terminal of said PMOS transistor, said inverting input terminal being connected to said first terminal of said offset bias source, and said output terminal being connected to said gate terminal of said PMOS transistor, wherein said second terminal of said offset bias source is connected to said drain terminal of said PMOS transistor.

16. The switching regulator of claim 13, wherein said active diode comprises:
a transistor having a first terminal, a second terminal and a control terminal;
an amplifier having a non-inverting input terminal and an inverting input terminal, and an output terminal, said non-inverting input terminal being connected to said first terminal of said transistor via an offset bias source, said inverting input terminal being connected to said second terminal of said transistor;

a summer circuit having a first input for receiving a control signal from said controller, a second input for receiving an output signal from said amplifier and an output; and a driver circuit having an input for receiving said output of said summer circuit, and an output coupled to said control terminal of said transistor, said driver circuit operable for controlling operation of said transistor based on said output of said summer circuit.

17. The switching regulator of claim 13, wherein said controller further comprises a mode control circuit configured to control said active diode.

18. The switching regulator of claim 17, wherein said mode control circuit comprises:

a first window comparator configured to compare a difference between a divided output voltage proportional to said output voltage and a first reference voltage with a first threshold voltage and to output a first compared signal;

a second window comparator configured to compare a signal indicative of a difference between said divided output voltage and said first reference voltage with a second threshold voltage and to output a second compared signal; and a latch having a set input and a reset input, said latch being configured to receive said first compared signal at said set input and said second compared signal at said reset input, and to output a mode signal.

19. The switching regulator of claim 18, further comprising a first compensator circuit, wherein said first compensator circuit comprises:

a first differential input transconductance amplifier having a first input configured to receive said divided output voltage, a second input configured to receive said first reference voltage, a first output and a second output; and a first compensator network connected to said first output of said first differential input transconductance amplifier for creating a first compensator error signal, wherein said signal indicative of a difference between said divided output voltage and said first reference voltage is a signal output from said second output of said first differential input transconductance amplifier.

20. The switching regulator of claim 1, wherein said controller comprises:

a first compensator circuit configured to receive a first reference voltage and a proportional output voltage indicative of said output voltage and to output a first compensator error signal;

a second compensator circuit configured to receive a sum of said current signal indicative of an inductor current flowing in said inductor and said first compensator error signal and to output a second compensator error signal; and a modulator circuit configured to receive said input voltage and said second compensator error signal and to output a first control signal to control said first switch and a second control signal to control said second switch.

21. The switching regulator of claim 20, wherein said first compensator circuit comprises:

a first differential input transconductance amplifier having a first input configured to receive said proportional output voltage, a second input configured to receive said first reference voltage, a first output and a second output; and a first compensator network connected to said first output of said first differential input transconductance amplifier for creating said first compensator error signal.

22. The switching regulator of claim 21, further comprising a mode control circuit configured to control at least one of said first diode or said second diode, wherein said mode control circuit comprises:

a first window comparator configured to compare a difference between said proportional output voltage and said first reference voltage with a first threshold voltage and to output a first compared signal;

a second window comparator configured to compare a signal output from said second output of said first differential input transconductance amplifier with a second threshold voltage and to output a second compared signal; and a latch having a set input and a reset input, said latch being configured to receive said first compared signal at said set input and said second compared signal at said reset input, and to output a mode signal.

23. The switching regulator of claim 20, wherein said second compensator circuit comprises:

a second differential input transconductance amplifier having a first input configured to receive a second reference voltage, a second input configured to receive a sum of said current signal indicative of said inductor current and a current proportional to said first compensator error signal, a first output connected to said second input and a second output configured to output a current; and a second compensator network connected to said second output of said second differential input transconductance amplifier for creating said second compensator error signal.

24. The switching regulator of claim 20, wherein said modulator circuit comprises:

a level shift and scale block configured to convert said second compensator error signal and said input voltage into a first error signal and a second error signal;

a clock generator configured to generate a clock signal; and a comparator block configured to compare said first error signal with said clock signal for outputting said first control signal and to compare said second error signal with said clock signal for outputting said second control signal.

25. The switching regulator of claim 24, wherein said clock signal is a triangular signal having a peak value, a valley value and a slope, and at least one of said peak value, valley value and slope is proportional to said input voltage while frequency of the triangular signal is constant.

26. The switching regulator of claim 20, further comprising a mode control circuit configured to control at least one of said first diode or said second diode, wherein said mode control circuit comprises:

a first window comparator configured to compare a difference between said divided output voltage proportional to said output voltage and said first reference voltage with a first threshold voltage and to output a first compared signal;

a second window comparator configured to compare a signal indicative of a difference between said divided output voltage and said first reference voltage with a second threshold voltage and to output a second compared signal; and a latch having a set input and a reset input, said latch being configured to receive said first compared signal at said set input and said second compared signal at said reset input, and to output a mode signal.

27. A method of regulating an output voltage in a circuit having an inductor, first switch and a second switch, comprising:
- comparing a proportional output voltage indicative of said output voltage with a first reference voltage for outputting a voltage error signal;
- comparing a signal indicative of a current flowing in said inductor with a second reference voltage for outputting a current error signal;
- converting said current error signal into a first error signal and a second error signal; and
- comparing said first error signal with a clock signal for outputting a first control signal to control said first switch and comparing said second error signal with said clock signal for outputting a second control signal to control said second switch.

28. The method of claim 27, wherein said comparing a signal includes comparing a signal indicative of a sum of said signal indicative of a current flowing in said inductor and said voltage error signal with said second reference voltage.